J. H. BEARDSHAW.
EPICYCLIC GEARING.
APPLICATION FILED SEPT. 3, 1915.

1,173,478.

Patented Feb. 29, 1916.
2 SHEETS—SHEET 1.

Inventor:
Joseph Herbert Beardshaw
By Knight Bros
his Attorneys

J. H. BEARDSHAW.
EPICYCLIC GEARING.
APPLICATION FILED SEPT. 3, 1915.

1,173,478.

Patented Feb. 29, 1916.
2 SHEETS—SHEET 2.

Inventor:
Joseph Herbert Beardshaw
By Knight Bros
his Attorney

UNITED STATES PATENT OFFICE.

JOSEPH HERBERT BEARDSHAW, OF SHEFFIELD, ENGLAND.

EPICYCLIC GEARING.

1,173,478. Specification of Letters Patent. Patented Feb. 29, 1916.

Application filed September 3, 1915. Serial No. 48,861.

*To all whom it may concern:*

Be it known that I, JOSEPH HERBERT BEARDSHAW, a subject of the King of Great Britain, residing at Sheffield, in the county of York, England, have invented new and useful Improvements in Epicyclic Gearing, of which the following is a specification.

The object of the present invention is to construct an improved epicyclic gearing According to the present invention I employ a base or fixed part on which the gearing is mounted. The base is provided with a projecting neck, to which is fixed a toothed pinion. This fixed pinion has a fixed stud, upon which rotates a cranked carrier. The cranked carrier has two parallel arms connected at their outer ends. The longer arm is mounted upon the said stud and projects diametrically on both sides thereof. The shorter arm extends from its connection with the longer arm slightly beyond a continuation of the axis of said stud. The longer arm of the carrier is formed with a bearing near its end, in which is located a short axle. On one end of this axle is fixed a toothed wheel gearing with the said fixed pinion, and on the other end of this axle is fixed a dished wheel having internal teeth. The shorter arm of the carrier has a bearing concentric with the fixed pinion, in which is located the axle of a driving crank. On the inner end of this axle is fixed a toothed pinion meshing with the internal teeth of the dished wheel, which latter gives motion, directly or indirectly, to a flanged wheel having internal teeth which it is desired to drive by rotation of the crank. The dished wheel may have external gear teeth which mesh with internal teeth on the said flanged wheel.

In a modification the dished wheel is adapted to drive a chain which gives motion to a small chain wheel fixed on an axle carried in bearings near the outer ends of the two parallel arms, or carried by a second carrier capable of rotating on the fixed stud. On one of the ends of this axle is fixed a toothed wheel meshing with the internal teeth on the flanged wheel which it is desired to drive. This last-mentioned toothed wheel may also mesh with a second fixed toothed pinion concentric with the first-mentioned fixed pinion.

Various methods of carrying the invention into effect are shown in the accompanying drawings, in which:—

Figure 1:
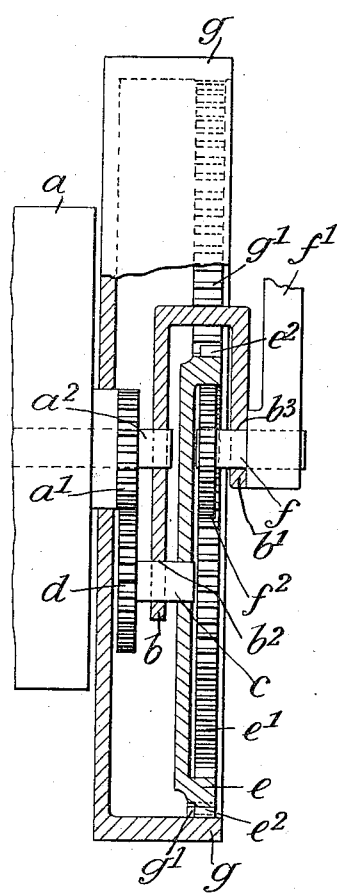
Figure 2:
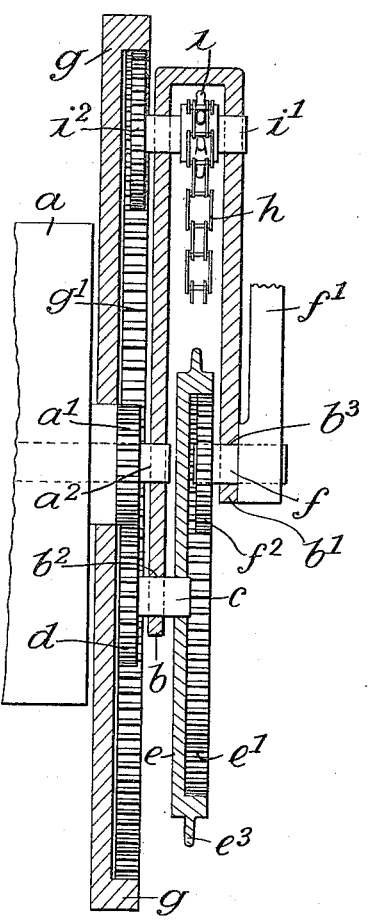
Figure 4:
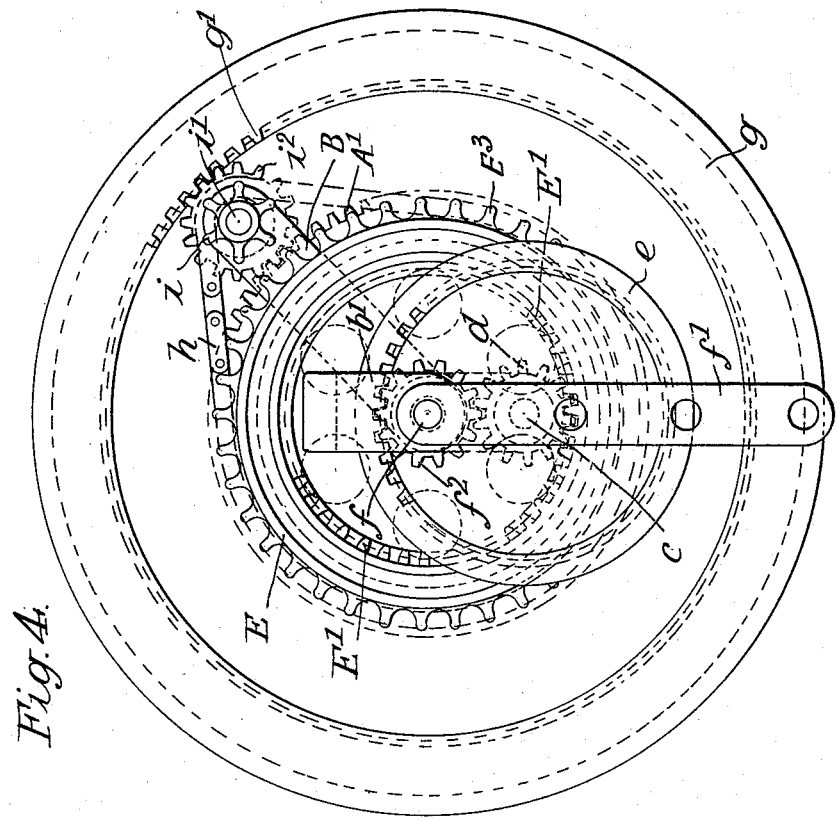
Figure 3:
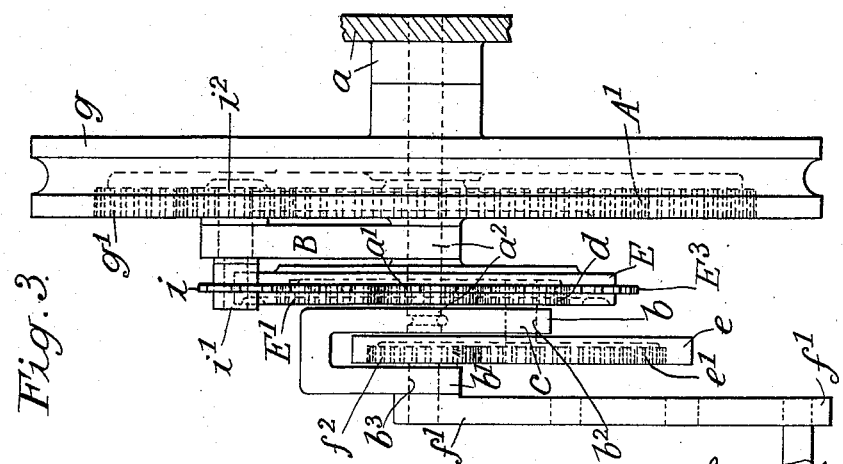

Figure 1 is a side elevation partly in section showing one method of carrying the invention into effect. Fig. 2 is a side elevation partly in section showing a modification. Fig. 3 is a side elevation showing another modification, and Fig. 4 is a front elevation of that form of the gearing shown in Fig. 3.

$a$ is the base or fixed part having a toothed pinion, $a^1$, fixed thereto, and $a^2$ is a fixed stud.

$b$, $b^1$, is a cranked carrier, the longer arm, $b$, of which is mounted freely upon the fixed stud $a^2$. This arm $b$ is formed, near one end, with a bearing, $b^2$, in which is located a short axle, $c$, on one end of which is fixed a toothed wheel, $d$, gearing with the fixed pinion $a^1$. On the other end of this axle $c$ is fixed a dished wheel, $e$, having internal teeth, $e^1$. The shorter arm, $b^1$, of the carrier has a bearing, $b^3$, in which is located the axle, $f$, of a driving crank, $f^1$. On the inner end of the axle $f$ is fixed a toothed pinion, $f^2$, meshing with the internal teeth $e^1$ of the dished wheel $e$. Rotation of the crank $f^1$ gives rotary motion to the dished wheel $e$, and this latter gives motion, directly or indirectly, to the flanged wheel, $g$, which it is desired to drive.

All the parts above described with reference to the drawings are common to the three forms of apparatus shown in Figs. 1, 2 and 3.

In the form of gearing shown in Fig. 1 the dished wheel $e$ has external gear teeth, $e^2$, which mesh with the internal teeth, $g^1$, of the flanged wheel $g$.

In the form of gearing shown in Fig. 2 the dished wheel $e$ has external sprocket teeth, $e^3$, giving motion to a chain, $h$, passing over the small chain wheel, $i$, fixed on the axle, $i^1$, mounted in bearings in the carrier arms $b$, $b^1$; to one end of this axle $i^1$ is keyed the gear wheel, $i^2$, meshing with the internal teeth $g^1$ of the flanged wheel $g$.

In the form of gearing shown in Figs. 3 and 4 the wheel $e$ does not give motion directly to the wheel $g$, but the wheel $d$, which is rigidly connected to the wheel $e$ through the axle $c$, meshes not only with the fixed pinion $a^1$, but also with internal teeth $E^1$ in the dished wheel E, and drives the same. The dished wheel E has sprocket teeth, $E^3$, giving motion by the chain $h$ to the small chain wheel $i$ on the axle $i^1$ located in a bearing in the carrier B, which, like the carrier $b$, $b^1$, is mounted on the fixed stud $a^2$. The axle $i^1$ has a gear wheel, $i^2$, which meshes with the internal teeth $g^1$ on the flanged wheel $g$ and drives this latter. It will be observed that the gear wheel $i^2$ also meshes on one side with the fixed toothed wheel $A^1$.

The operation of the gearing is as follows: Rotary motion is given to the crank $f^1$ by hand or otherwise, thus rotating the axle $f$ and toothed wheel $f^2$. This latter gives rotary motion to the dished wheel $e$, which, being rigid with the toothed wheel $d$, gives rotary motion to this latter and causes it, the dished wheel $e$ and the carrier $b$ $b^1$ to rotate with respect to the fixed pinion $a^1$. The dished wheel $e$ likewise gives rotary motion to the flanged wheel $g$, from which the power is transmitted by a strap or otherwise.

In the gearing shown in Fig. 1 the dished wheel $e$ gives rotary motion to the flanged wheel $g$ by external teeth $e^2$ directly meshing with internal teeth $g^1$ on the flanged wheel $g$.

In the gearing shown in Fig. 2 the dished wheel $e$, which has sprocket teeth $e^3$, gives rotary motion by the chain $h$ to the small chain wheel $i$ and to the toothed wheel $i^2$, the wheels $i$ and $i^2$ being fixed on the same shaft $i^1$. The toothed wheel $i^2$ gives rotary motion to the flanged wheel $g$ by meshing directly with the internal teeth $g^1$. In this modification the carrier $b$ $b^1$, the sprocket wheel $i$ and the toothed wheel $i^2$, all rotate with respect to the fixed pinion $a^1$, due to the toothed wheel $d$ meshing with the fixed pinion $a^1$.

In the modification shown in Figs. 3 and 4 the crank $f^1$ gives rotary motion to the axle $f$ and toothed wheel $f^2$, and this latter gives rotary motion to the dished wheel $e$, which is rigid with respect to the toothed wheel $d$, and this latter, the carrier $b$ $b^1$, and the dished wheel $e$, all rotate with respect to the fixed pinion $a^1$. The toothed wheel $d$ gives rotary motion to the dished wheel E which, by means of the chain $h$, gives rotary motion to the toothed wheel $i^2$, which drives the flanged wheel $g$. The toothed wheel $i^2$ and carrier B rotate around the fixed stud $a^2$. The flanged wheel $g$ may give motion to any desired piece of mechanism by means of a strap or cord or otherwise.

The gearing is useful for lifting weights, and in cranes, but it is obvious that it may be used for other purposes.

I claim:—

1. In epicyclic gearing, the combination of a fixed base, a fixed toothed pinion on said base, a carrier adapted to rotate upon a fixed stud concentric with the fixed pinion, a short axle mounted in a bearing on said carrier, a toothed wheel on one end of said axle meshing with the fixed pinion, a dished wheel having internal teeth on the other end of said axle, a crank axle mounted in another bearing in said carrier, which bearing is concentric with the fixed pinion, a crank on one end of said crank axle and a pinion on the other end thereof meshing with the internal teeth on the said dished wheel, an outer flanged wheel having internal teeth and means whereby the dished wheel gives motion to the internal teeth on the outer flanged wheel, substantially as set forth.

2. In epicyclic gearing, the combination of a fixed base, a fixed toothed pinion on said base, a carrier adapted to rotate upon a fixed stud concentric with the fixed pinion, a short axle mounted in a bearing on said carrier, a toothed wheel on one end of said axle meshing with the fixed pinion, a dished wheel having internal teeth on the other end of said axle, a crank axle mounted in another bearing in said carrier, which bearing is concentric with the fixed pinion, a crank on one end of said crank axle and a pinion on the other end thereof meshing with the internal teeth on said dished wheel, a second dished wheel having internal teeth which are driven by the said toothed wheel on the short axle, sprocket teeth on the second dished wheel, a chain driven by the sprocket teeth, a small chain wheel driven by said chain, an axle on which the small chain wheel is fixed, a second carrier mounted on the fixed stud and having a bearing in which the last-mentioned axle is located, a gear wheel on this last-mentioned axle, and a flanged wheel having internal teeth driven by the last-mentioned gear wheel, substantially as shown and described.

In witness whereof I have hereunto set my hand.

JOSEPH HERBERT BEARDSHAW.